(12) United States Patent
Cheung et al.

(10) Patent No.: US 8,676,489 B2
(45) Date of Patent: Mar. 18, 2014

(54) POSITIONING MAP VIEWS TO SHOW MORE OPTIMAL ROUTE INFORMATION

(75) Inventors: Matthew Cheung, Redmond, WA (US);
Markus Ludwig Jansen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1350 days.

(21) Appl. No.: 12/027,278

(22) Filed: Feb. 7, 2008

(65) Prior Publication Data

US 2009/0204892 A1    Aug. 13, 2009

(51) Int. Cl.
*G01C 21/34* (2006.01)

(52) U.S. Cl.
USPC ........................................................ 701/400

(58) Field of Classification Search
None
See application file for complete search history.

(56) References Cited

U.S. PATENT DOCUMENTS

| | | | |
|---|---|---|---|
| 5,802,492 A * | 9/1998 | DeLorme et al. | 455/456.5 |
| 5,938,720 A | 8/1999 | Tamai | |
| 5,974,419 A * | 10/1999 | Ashby | 1/1 |
| 6,321,158 B1 | 11/2001 | DeLorme et al. | |
| 6,487,305 B2 | 11/2002 | Kambe et al. | |
| 6,498,982 B2 | 12/2002 | Bellesfield et al. | |
| 6,567,743 B1 | 5/2003 | Mueller et al. | |
| 7,076,409 B2 | 7/2006 | Agrawala et al. | |
| 7,403,851 B2 * | 7/2008 | Kaufman et al. | 701/200 |
| 2007/0021905 A1 | 1/2007 | Takashima et al. | |
| 2007/0067103 A1 | 3/2007 | Fukumoto et al. | |
| 2007/0106465 A1 | 5/2007 | Adam et al. | |

FOREIGN PATENT DOCUMENTS

EP    1788354 A1    5/2007

OTHER PUBLICATIONS

Agrawala, NPL_p241-agrawala.pdf, downloaded from http://delivery.acm.org/10.1145/390000/383286/p241-agrawala.pdf?ip=151. 207.246.4&CFID=29120613&CFTOKEN=47145821&_acm_= 1309221107_213c0f7425e0789c8cabc5cf13bebcef , pp. 241-250, downloaded on Jun. 27, 2011.*
"MapInfo", Date: 2003, pp. 1-32.
Agarwala, et al., "A Design and Implementation for Effective Computer-Generated Route Maps", pp. 1-6.

* cited by examiner

*Primary Examiner* — Paul Danneman
(74) *Attorney, Agent, or Firm* — Steve Spellman; Jim Ross; Micky Minhas

(57) ABSTRACT

Described is a technology by which a more optimal map view with respect to route information is returned in response to an online mapping request. A start or end location is positioned away from the map center as appropriate to show as much route information as possible within the map view, given view size and zoom constraints. In one example, various-sized bounding boxes that contain the start or end location and one or more routes may be evaluated to determine a largest bounding box that meets the mapping size constraint; the center of that bounding box is the center of the map view. In one alternative, map views at various zoom levels may be scored against one another to determine which map view contains the most important route information, such as the most maneuver points and/or landmarks within each map view; the map view with the best score is returned.

15 Claims, 9 Drawing Sheets

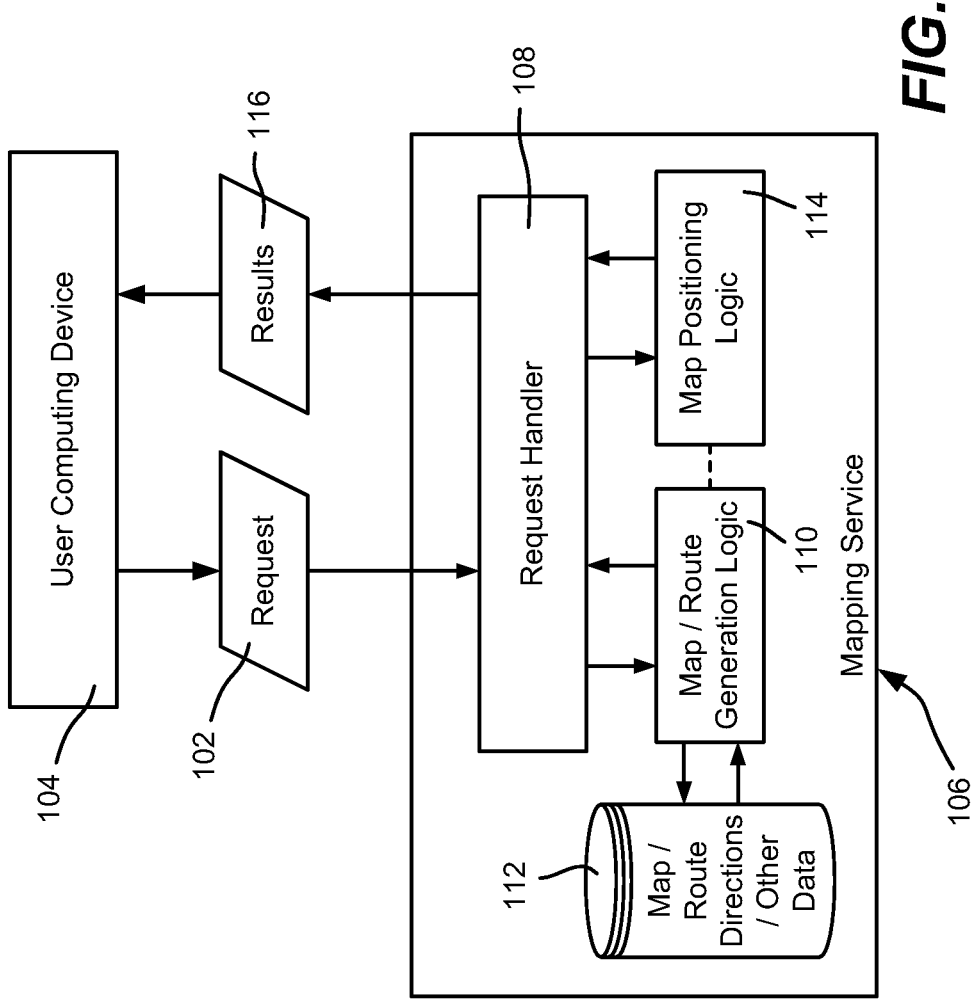

to FIG. 4D

POSITIONING MAP VIEWS TO SHOW MORE OPTIMAL ROUTE INFORMATION

BACKGROUND

Most contemporary online mapping services offer maps and directions for a route requested by a user. Typically the user enters a starting location (or uses a default starting location) and enters an ending destination, based upon which the service automatically generates a map showing the start and/or end of the requested route.

While in general such maps are functional, the positioning of such maps is not ideal in many instances. More particularly, existing solutions place the start or end location at the center of the map. This potentially causes important route details to be missed. Moreover, the available display area is not effectively used, as the route tends to appear only on the top, bottom, left or right portion of the map view.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a more optimal map view with respect to route information contained therein is returned in response to an online mapping request. A critical element (e.g., a start or end location) is positioned relative to a map view having size and zoom constraints, so that more data corresponding to a route (or routes) appear in the map view than would otherwise appear if not so positioned. For example, rather than centering the critical point relative to the map view, the critical point is positioned so that as much route information as possible appears in the map view.

In one aspect, bounding boxes (actually rectangles) are determined based on the critical element's location (a point) and where the route reaches various straight line distances from the critical element. The largest bounding rectangle that meets the mapping size constraint is selected as the best, as it contains the most route data, and, for example, may be used to compute the map view that is returned, e.g., by using the center of the bounding rectangle as the center of the map view.

In another aspect, various zoom levels are selected, and for each zoom level, a best map view is chosen as a candidate. The candidates are scored relative to one another, such as based on how much important route data (e.g., maneuver points and/or landmarks/points of interest) are contained within each candidate. The candidate with the best score is selected for use as the map view.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 1 is a block diagram representing example components of a mapping service that more optimally positions a map with respect to showing important points.

DETAILED DESCRIPTION

Figure 2A:
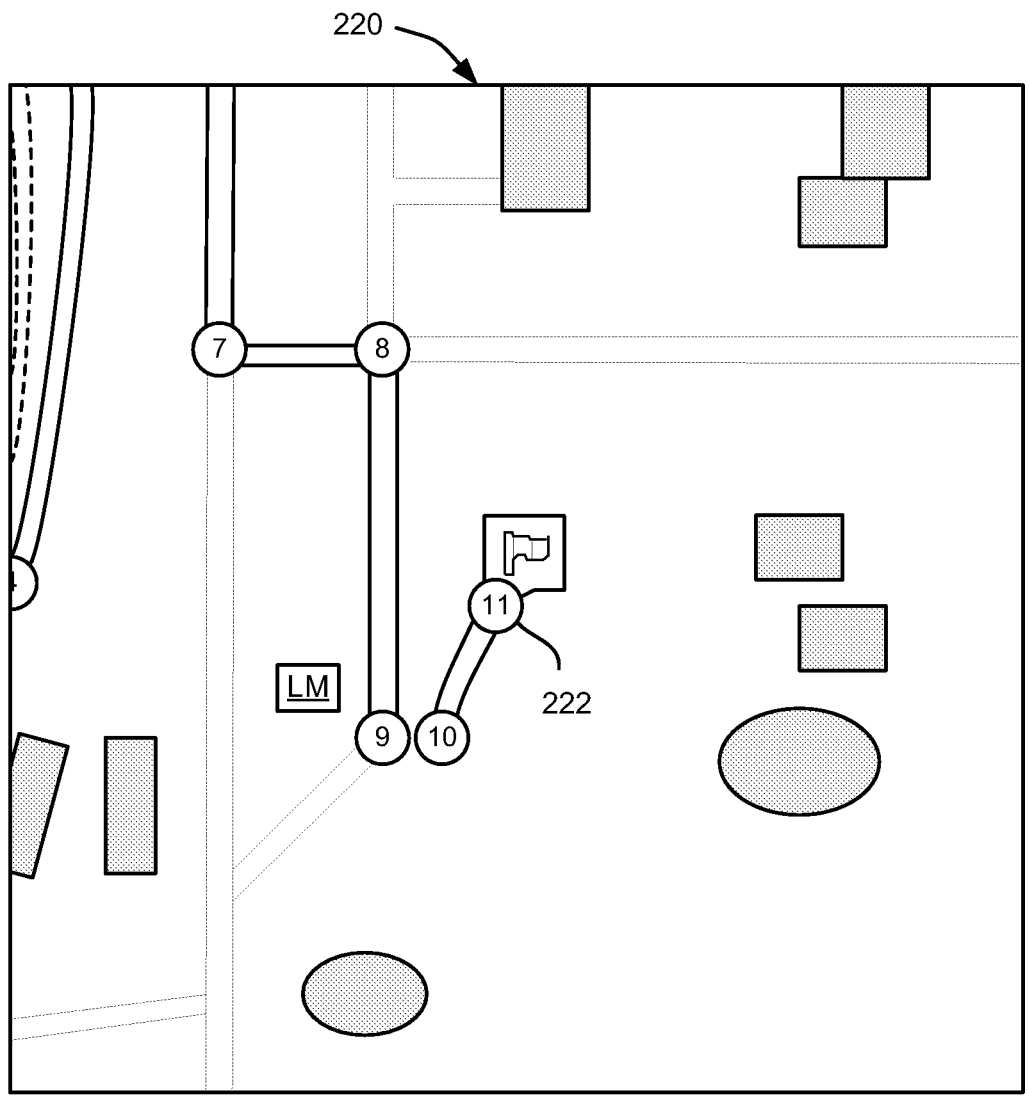
FIGS. 2A and 2B are representations of a map view (FIG. 2A) repositioned for more optimally showing important points on a route (FIG. 2B).

Various aspects of the technology described herein are generally directed towards returning an online map that is positioned in a more optimal fashion from the perspective of typical users. In general, when the map is positioned and returned, the start or end point is not necessarily at the center of the map view, but rather is located such that as many of the important details of a route (or routes) are visible in the map view, given limited viewing size and zoom constraints.

While the examples herein are primarily directed towards automobile driving routes in which important elements such as maneuver points (turning points, entrance and/or exit ramps and the like) are considered in map positioning, it will be understood that driving is only one use for the technology described herein. Any route may be displayed with accordingly relevant important elements, including for other forms of transit such as walking, jogging, nautical transit, aeronautical transit, and so forth, alone or in any combination. For example, instead of displaying an important turn while driving, important elements for walking and other transit may include locations such as a bus stop, train station, ferry terminal, taxicab stand and so forth.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and online mapping in general.

Turning to FIG. 1, there is shown a general architecture by which online mapping may be implemented, including various map positioning aspects as described herein. In general, a request 102 is sent from a user computing device 104 to a mapping service 106. As represented in FIG. 1, a request handler 108 of the mapping service 106 handles the request, so that, for example, requests not related to mapping are differentiated from those that are.

For requests related to mapping, map/route generation logic 110 accesses a data store 112 to generate and/or retrieve an image corresponding to the requested map, typically with the route highlighted in some way. Directions may also be retrieved and/or computed, as well as other information, such as data on important landmarks and/or other points of interest. Note that the data store 112 may be composed of distinct databases, e.g., one for image generation, one for directions, and one for landmarks and other points of interest, or may be a single database or any combination thereof.

Conventional map/route generation logic returns a map view centered at the start or end location provided in association with the request 102. For example, if a user is requesting directions from a location known to a mapping service to be associated with that user, such as the user's work or home address, the end location may be selected as the center of the map view. Conversely, if the user's requested end destination is known to be associated with that user, e.g., work or home, the starting point may be selected as the center of the map view. In this way, a user sees a map centered around what is likely unfamiliar rather than what is familiar and typically not needed.

As described herein, rather than return such a start/end-centered map view to a user, map positioning logic 114 positions the map view into a more optimal view, such that additional important points may be presented in the initially returned view (the core view). Note that as represented in FIG. 1, the map positioning logic 114 is depicted as a separate component from the map/route generation logic 110, however it can be readily appreciated that the map positioning logic 114 may be incorporated into the map/route generation logic 110, as represented by the dashed line between the components 110 and 114. In any event, the map positioning logic 114 works in conjunction with the map/route generation logic 110 to return results 116 including a map view that appears to be more intelligently positioned with respect to important points along the route. Note that a user can manually drag or otherwise scroll a start/end centered map image to attain a similar result, however the map positioning logic automatically provides the initially returned map view as a more optimal view with respect to showing important points.

By way of example, FIG. 2A represents a map view 220 centered around an end destination (or starting point) 222 (also indicated by the flag and circled numeral eleven (11)). Such a map be provided by the map/route generation logic 110 without positioning considerations as described herein, such as for further repositioning processing. In FIG. 2A, important elements in the form of maneuver points are indicated by the circled numerals seven (7) through ten (10).

Figure 2B:
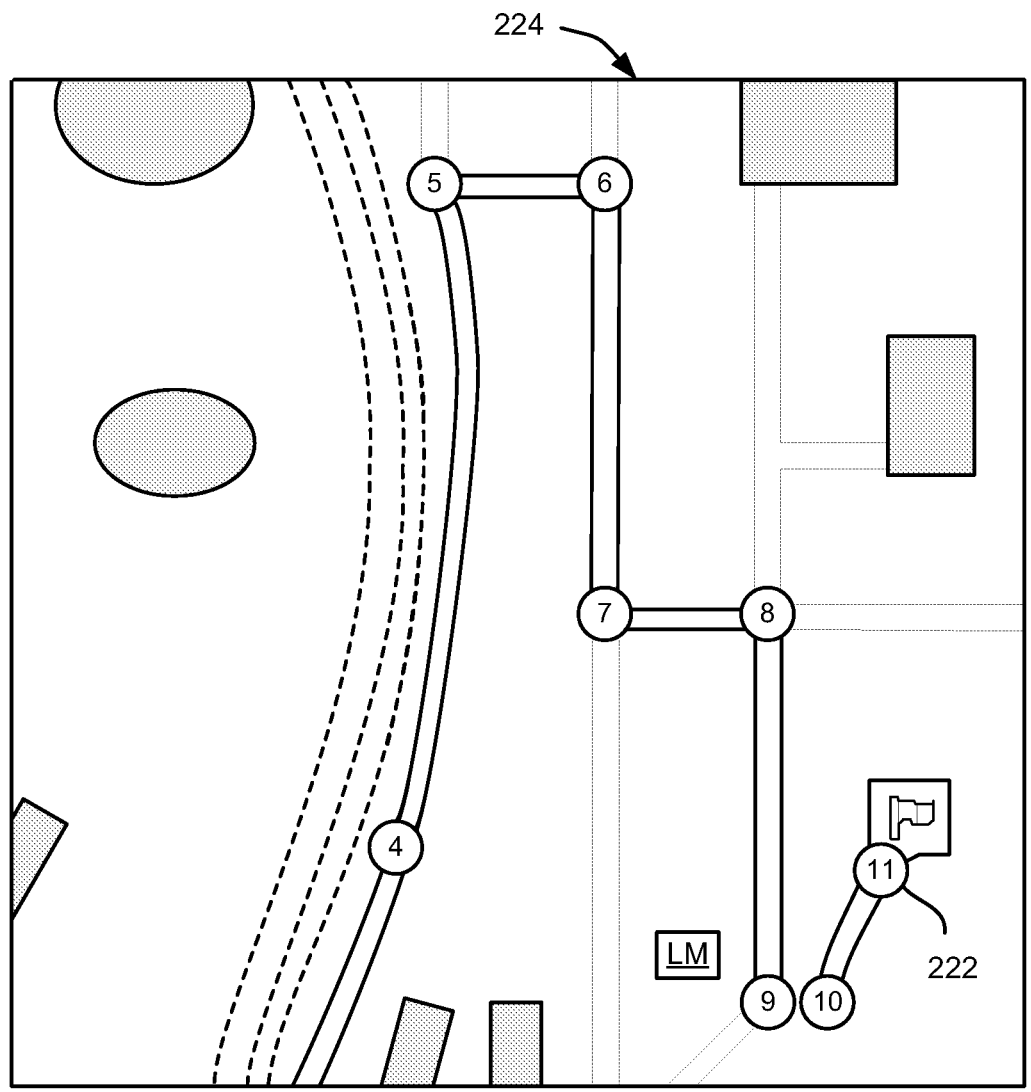

For purposes of simplicity, certain labels such as street names/numbers and building names have been omitted from FIGS. 2A and 2B, although a landmark (LM) is shown. Further, instead of using color and/or solid lines to indicate the computed route, in FIGS. 2A and 2B the computed route is indicated by solid lines, while other roads not on the route are indicated by dashed lines.

FIG. 2B represents the map view 220 having been positioned into a new map view 224. Note that this may be an actual repositioning given the (previous) map view 220, or may be a logical repositioning, e.g., a map view is not yet generated but its data such as coordinates and accompanying information (e.g., important points, directions and/or landmarks/other points of interest) are provided to the map positioning logic 114 from which an actual view is generated.

As can be seen in FIG. 2B, a more optimal map view with respect to important elements is generated and returned by positioning the end destination (or starting point) 222 away from the center, in this example towards the lower right corner in the view 224. In FIG. 2B, not only are the previously visible important maneuver points indicated by the circled numerals seven (7) through ten (10) still visible, but additional maneuver points indicated by the circled numerals four (4) through six (6) are now visible. As can be seen, by returning the map view 224 of FIG. 2B (instead of the view 220 of FIG. 2A of the map image), more important information is presented to the user without changing the image size or the zoom level.

In addition to the route itself and any maneuver points, there may be one or more other landmarks/other points of interest that may be of value for orientation by the user. It is not required that these landmark/other point of interest elements are within the map view, but because of their value may be presented as part of the map view. Thus, while in this example the landmark LM is also visible in FIG. 2B, it can be readily appreciated that after positioning, the landmark LM may no longer be visible in the view; whether it is visible may be based on its importance as an element, e.g., its importance may be assigned a weight that may be evaluated against the weight of having the additional important elements displayed in positioning the map view.

Figure 3:
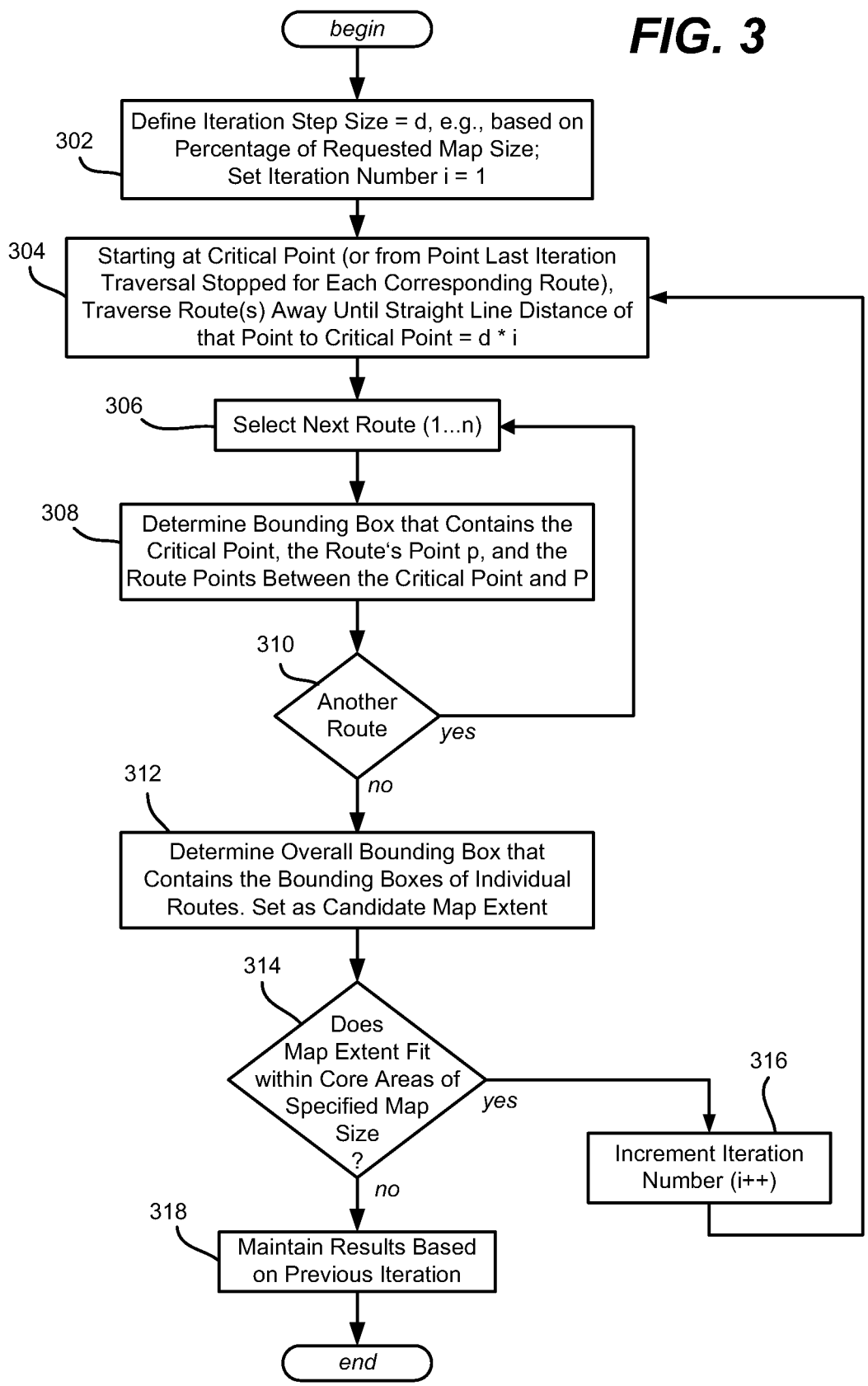
FIG. 3 is a flow diagram representing example steps taken to reposition a map view.

FIG. 3 is a flow diagram representing example steps that may be taken to position a map view based on important elements in a map image. In general, to provide the user with an appropriate perspective, one (possibly more than one) critical point is selected that will be present in the map view. For example, the start or end point is ordinarily considered a critical point that needs to be visible within the initially returned (core) map view. For enhanced visibility, in addition to being shown in the core map view, the critical point is located a certain minimum margin distance from the edge (or edges).

While no specific number of maneuver points leading to or from the critical point is required, it is generally desirable to show as many maneuver points and/or other key information as possible, within the size and zoom constraints of the map view. More particularly, because view size is limited and in a typical user scenario the zoom needs to at least show the street level so that streets, and at least some of their names, are visible, positioning the critical point so as to show additional maneuver points (that are otherwise not visible when the critical point is simply centered) is desirable. Note that some routes may be classified into start/middle/end segments, whereby, for example, the waypoints corresponding to the start or end segments may have a relatively higher value if the request is for a view of the start or end point, respectively. With respect to the actual route, it is generally desired to show as much of the actual route as possible (subject to the constraints).

As generally exemplified with reference to FIG. 3, once the important element or elements of an area of interest have been identified, the map view is selected. To this end, an iterative scoring mechanism may be used to attempt to optimize the placement of these elements given the constraints based on the map image and application, namely that the critical point needs to be visible, the map view needs to fit in the requested image size, and the map zoom level needs to be within a certain range. While any actual algorithm and weighting scheme may be used depending on the specific application, the following example steps provide example guidelines.

Step 302 represents defining an iteration step size, denoted by the variable d, which in this example is based on a percentage of the requested map size, e.g., max(x+y)/20 where x and y are the height and width of the requested map. As will be understood below, a smaller d value leads to more optimal map, but generally requires more computation time. Step 302 also initializes the iteration number to one (1).

Starting at the critical point, typically the start or end location, step 304 represents traversing the route (or routes; note that multiple routes may be presented, as described below) away from the critical point, until the straight line distance of that point on the route to the critical point equals the iteration step size times the iteration number (d*i). For the first route, this point is identified as p1; it is p2 for the second route and so forth, up to pn for the nth route.

Figure 4A:
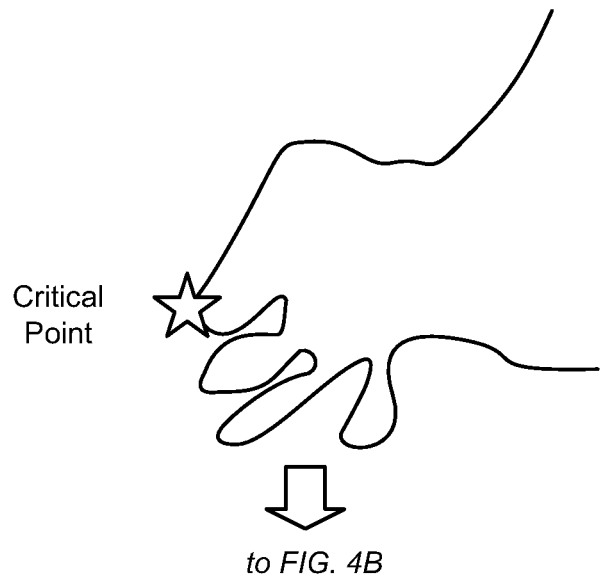
FIGS. 4A-4D are representations of how a map view is positioned for more optimally showing route representations.
Figure 4B:
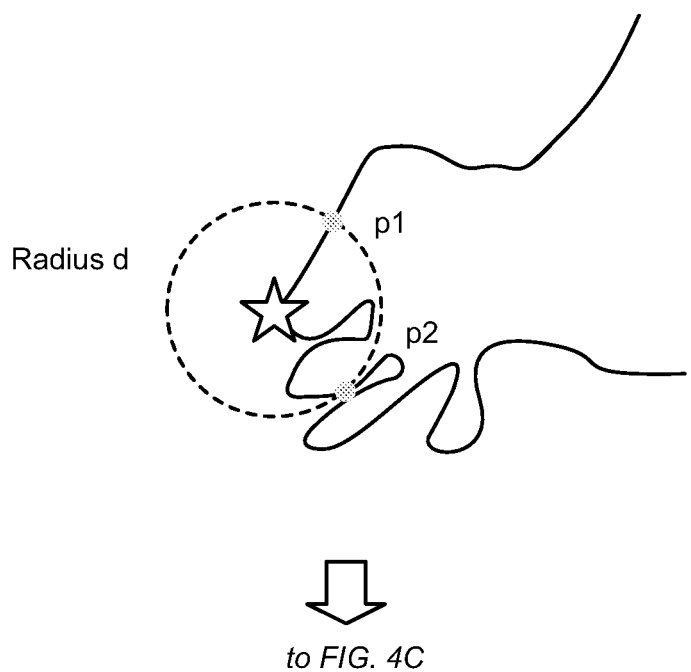

By way example FIG. 4A shows two routes to or from a critical point. Following the first route, a point p1 is defined as represented in FIG. 4B, at where that route intersects the straight line distance d from the critical point. In essence, d corresponds to the radius of a circle, which each route intersects to create a point; thus the points p1 and p2 are where the first and second routes intersect the circle, respectively, that is, at the straight line distance d from the critical point.

Figure 4C:
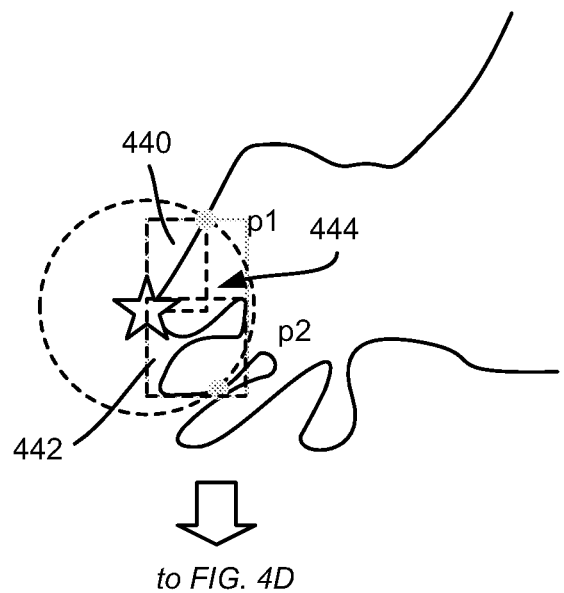

As represented in FIG. 4C and by steps 306, 308 and 310 of FIG. 3, bounding boxes (actually rectangles) are formed for each route. For the first route, the bounding rectangle is the smallest possible rectangle that includes the critical point, the point p1, and all points of the first route between the critical point and p1. The second bounding rectangle includes the critical point, and the p2 point, and all points of the second route between the critical point and p2; any further bounding rectangles include the critical points and its radius intersection point, and all points of the route between the critical point and the radius intersection points, up to the pn point. In this example, two such rectangles are represented in FIG. 4C for the two routes, namely rectangle 440 for the route corresponding to the point p1 and rectangle 442 for the route corresponding to the point p2 and including point p1.

Step 312 represents determining the overall bounding rectangle for this iteration i, which is a bounding rectangle that contains all of the other bounding rectangles found at step 308. In the current example, the rectangle 444 contains the rectangles 440 and 442 and is thus the overall bounding rectangle. At this time, a candidate map extent has been determined corresponding to the overall bounding rectangle 444 dimensions (e.g., the width and height are known to fit in the map's view size).

Figure 4D:
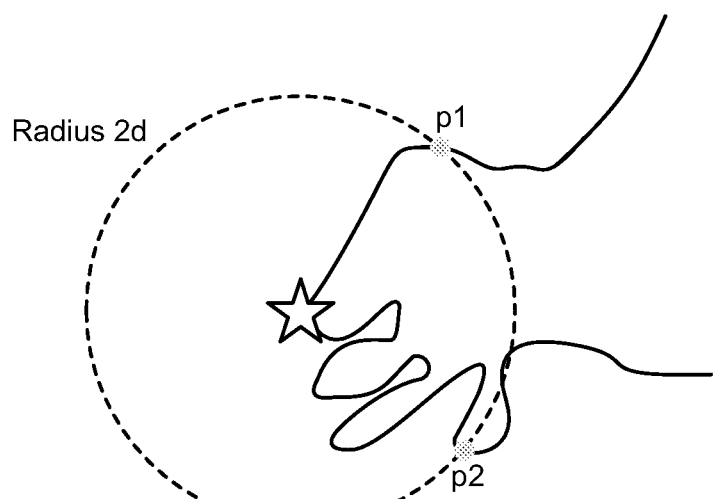

Step 314 evaluates whether this overall bounding rectangle fits within the core area (considering edge margins for the critical point) of the specified map size. If the overall bounding rectangle fits, it is possible that even an even larger overall bounding rectangle containing more of the route or routes may fit in the specified map size (e.g., because the d value was relatively small). To determine whether or not a larger bounding rectangle may fit, the iteration number is incremented at step 316, and the process repeated from step 304; for efficiency, rather than starting again at the critical point, the process may remember where it left off tracing each route in the previous iteration, and resume tracing from that point. Note that incrementing the iteration number increases the radius corresponding to the straight line distance d as represented in FIG. 4D, (e.g., the radius is two times d for the second iteration, three times d for the third iteration, and so forth). Note that a smaller increase may be used, e.g., 0.5 instead of 1.0, however starting with a smaller iteration step value (the d value) is equivalent. Further note that instead of increasing the radius until the largest overall bounding rectangle that fits is found, alternative techniques such as decreasing from a large starting radius, may be used, as can binary search and interpolation search concepts that close in on an appropriate size.

If the overall bounding rectangle does not fit the size constraint, then the overall bounding rectangle found in the previous iteration is the best view for the particular zoom level and is maintained as such. In the event that the very first iteration determines an overall bounding rectangle that does not fit (which may occur if the iteration step size d value is initially too large), a smaller initial d value may be chosen and the process re-run.

At step 318, the result of this process is a bounding rectangle upon which an optimal map view for this zoom level map be based, e.g., the map view is generally centered at the center of the previous (largest) bounding rectangle that did fit at step 314 in the previous iteration. This map view may be returned as the results 116 (FIG. 1), or may be used as part of a map view selection process as described below with reference to FIG. 5.

More particularly, if desired, calculations for various other map zoom levels can be considered, to provide a series of potential best map views at a range of acceptable zoom levels. The resultant map view for each zoom level can be scored based on how much valuable information it includes, e.g., the view corresponding to the zoom level that includes the most maneuver points may be given the highest score. Note that the set of acceptable zoom levels may be ordered such that in the event two or more zoom levels have the same score, the more desirable zoom level (e.g., the most zoomed-in) will be chosen.

Figure 5:
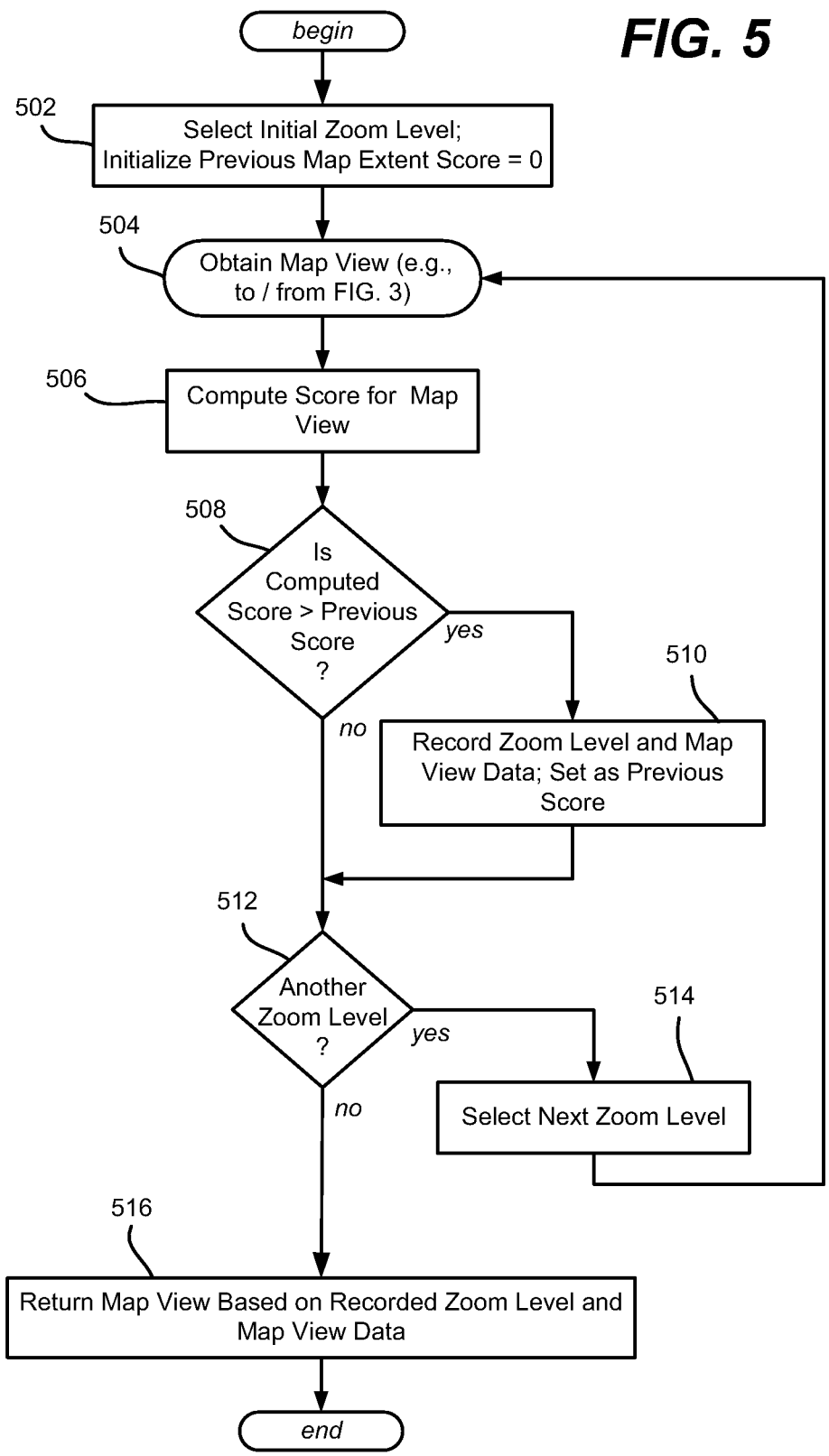
FIG. 5 is a flow diagram representing example steps taken to score candidate map views corresponding to different zoom levels for selecting a map view having a best score.

To select a map view from multiple zoom levels, as represented at step 502 of FIG. 5, a zoom level is chosen from a set of acceptable zoom levels. With this zoom constraint (and the size constraint), a positioning process (e.g., the process of FIG. 3) is run as represented by step 504 to obtain a map view optimized for this zoom level as one potential map view that may be returned.

At step 506, the map view for the current zoom level is scored based on what is deemed important, such as the number of maneuver points therein. Landmarks and/or other points of interest may also be considered, e.g., weighed against maneuver points. Maneuver points need not have the same weight as each other, e.g., certain route segments may have more weight, a freeway exit may have more weight than a turn, maneuver points closer to the critical point may have more weight than those further away, and so forth.

As can be seen via the comparison and recording operations at steps 508 and 510 respectively, and by repeating for the various acceptable zoom levels via steps 512 and 514, the zoom level that results in the highest score is determined to be the most suitable, to provide the optimum map view for this set of directions. Step 516 returns the map view based on the most suitable zoom level and recorded map data.

As can be readily appreciated, some or all of the processes may be based on user configurable settings. For example, whether to allow a change in the returned zoom level (e.g., via FIG. 5) or use only a certain one (e.g., street level) may be a user configurable setting. Via a user setting, landmarks/other points of interest may be given more weight, such as for users that favor the use of landmarks/points when navigating a route. A user also provides a desired map view size so that a personal computer user with a large monitor will receive a larger map view than a user with a mobile device that has only a small screen.

Figure 6:
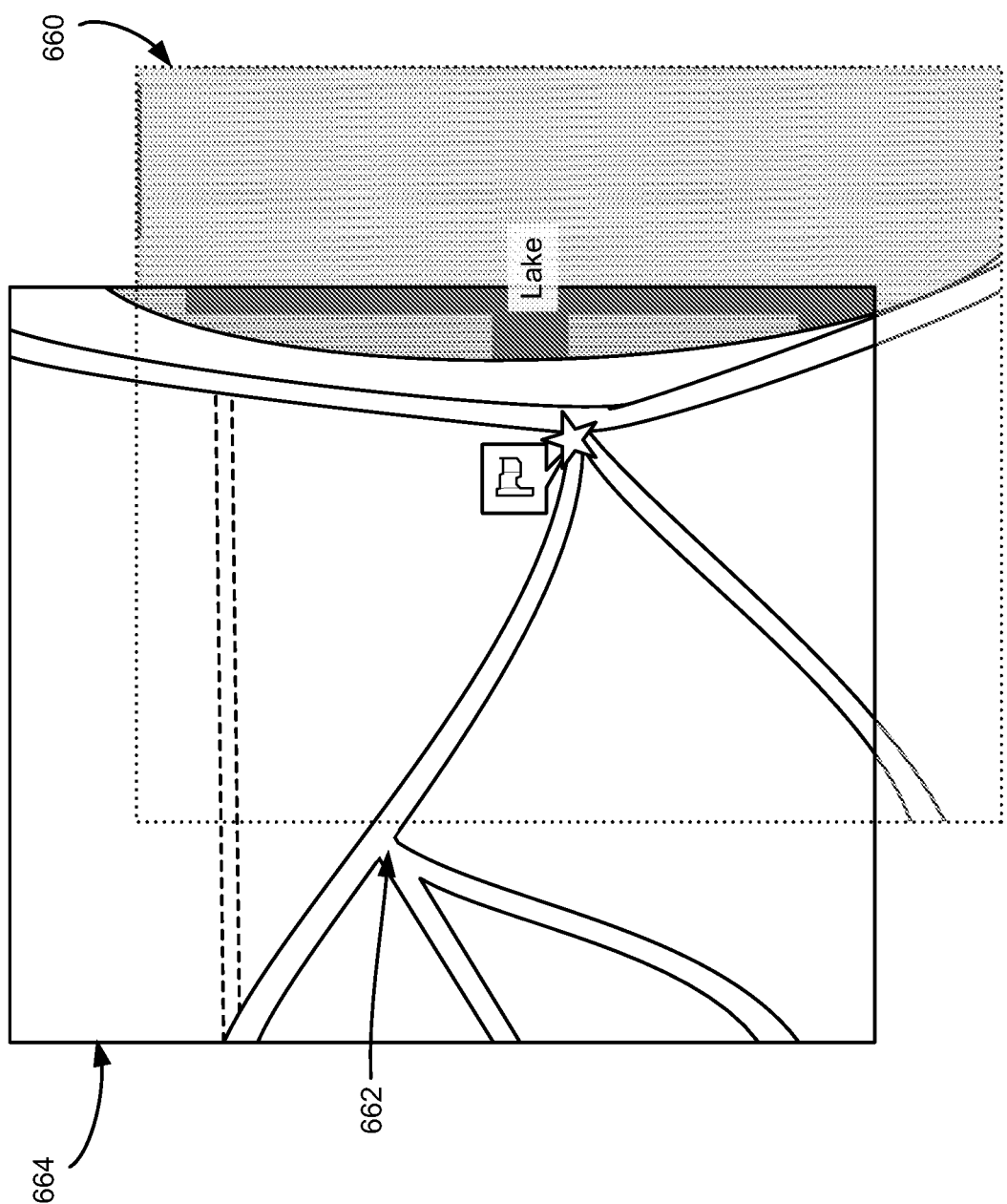
FIG. 6 is a representation of a plurality of routes and important points that are more visible or become visible in a map as a result of positioning a map view with respect to a critical point.

Turning to FIG. 6, multiple routes in a map that start or end at the same location are handled as described above. As can be seen, one benefit provided herein with multiple routes is that more important areas are included within the map view instead of unnecessary areas.

By way of example, consider a map that shows multiple routes to the same location, such as may be provided along with an invitation. A conventional map view as represented within the dashed box 660 that is centered at the critical point (represented by the flag/star in FIG. 6) has a considerable portion dedicated to showing the lake, which is at best a landmark/point of interest. Significantly, although four routes (generally from the North, South, Northwest and Southwest) are shown, the area 662 wherein important streets converge are omitted from the map view.

By instead positioning the map as described above, a map view 664 is provided that includes not only the four routes to the destination, but also includes the converging streets area 662. Because in this example the area's corresponding maneuver points are deemed more important than the lake, the processes described above provide a more optimal map to the user with respect to the important points.

As can be seen, described herein are various aspects of map view generation and/or positioning processes and mechanisms that provide a more optimized map view. Given a limited image size, the automatic generation of a map view shows as much of the relevant details of the route as possible, resulting for example in a more useful display of a route or routes relative to a start/end point.

Exemplary Operating Environment

Figure 7:
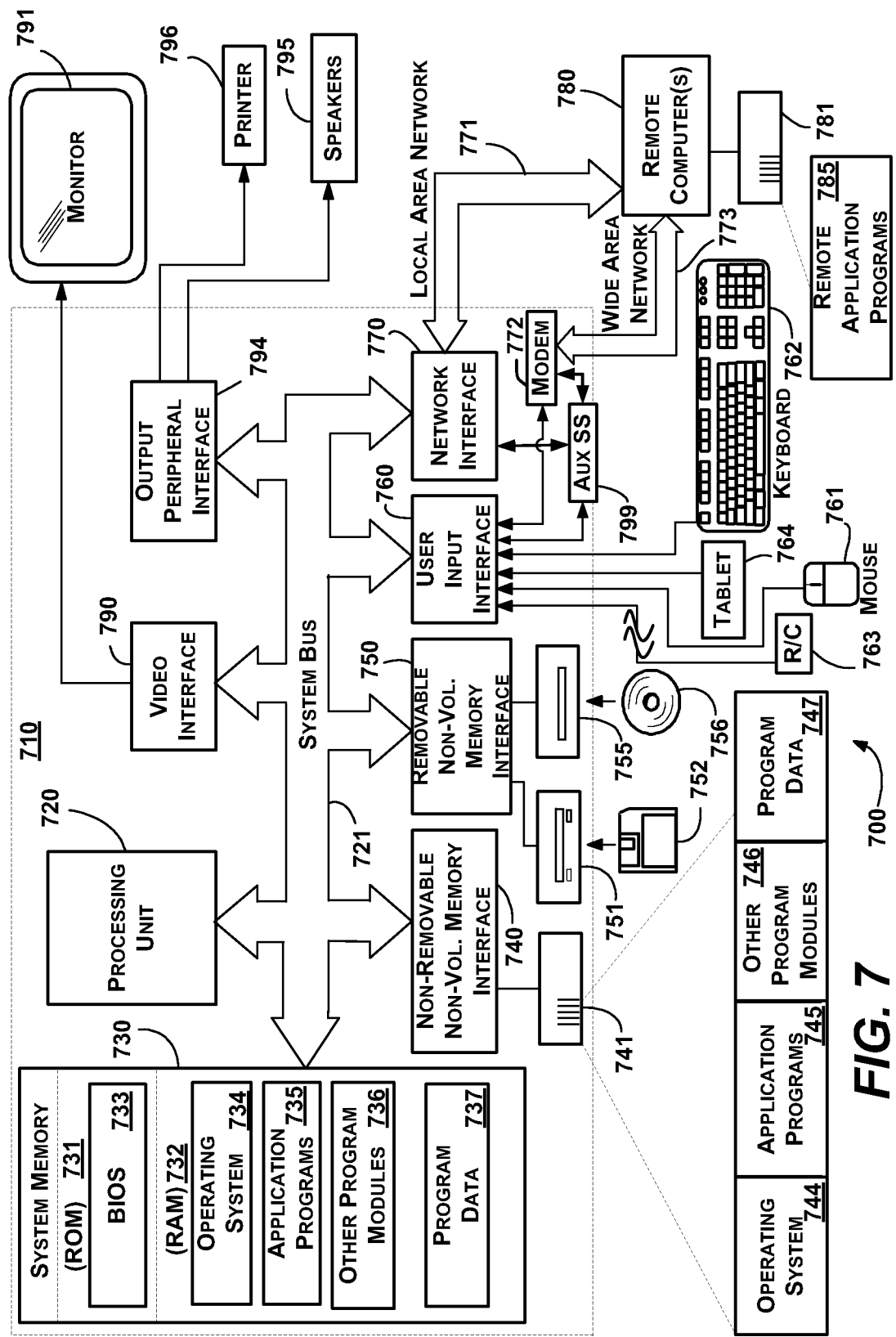
FIG. 7 shows an illustrative example of a computing environment into which various aspects of the present invention may be incorporated.

FIG. 7 illustrates an example of a suitable computing and networking environment 400 on which the examples of FIGS. 1-6 may be implemented. For example, the map generation logic 110 and map positioning logic 114 may be implemented in the computer system 410, while the device 104 may be represented by the remote computer 480. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method comprising:
employing at least one processor to perform steps comprising, obtaining a critical element to be provided in a map view having size and zoom constraints, the critical element associated with a route set containing at least one route; and
computing a map view by positioning the map view relative to the critical element so that more of the route set appears within the map view than appears in a non-positioned map view including by:
determining where each route of the route set reaches a straight line distance from the critical element;
determining a bounding box that includes the critical element and each point that corresponds to where each route reached the straight line distance, and each point of that route between the critical element and the point where the straight line distance was reached; and
computing at least one additional map view at a different zoom level, computing a best score for the map view and each additional map view, and returning the map view or an additional map view based on its computed score relative to the score computed for each other map view.

2. The computer-implemented method of claim 1 wherein obtaining the critical element comprises receiving data corresponding to a start or end location.

3. The computer-implemented method of claim 1 wherein the bounding box comprises a bounding rectangle that includes the critical element and each point that corresponds to where each route reached the straight line distance, and each point of that route between the critical element and the point where the straight line distance was reached.

4. The computer-implemented method of claim 1, further comprising changing the straight line distance into a changed straight line distance and determining where each route of the route set reaches the changed straight line distance.

5. The computer-implemented method of claim 4 wherein changing the straight line distance into a changed straight line distance comprises increasing the straight line distance, and wherein computing the map view further comprises determining a previous bounding rectangle that includes the critical element, each point that corresponds to where each route reached the straight line distance, and each point in between, determining a next bounding rectangle that includes the critical element and each point that corresponds to where each route reached the changed straight line distance, and if the other next rectangle does not meet the size constraint, using the previous bounding rectangle to determine the map view.

6. The computer-implemented method of claim 1 wherein computing the score comprises determining how many important elements are within the map view and the additional map view.

7. The computer-implemented method of claim 1 wherein computing the score comprises determining weights for important elements within the map view and the additional map view.

8. In a computing environment, a system comprising, at least one processor, a memory communicatively coupled to the at least one processor and including instructions configured to provide:

an online mapping service that receives configured to receive a request for a map, the mapping service coupled to a data store configured to provide map data comprising a critical element and route information in response to the request, the mapping service further including map positioning logic configured to generate a plurality of potential map views at different zoom levels and configured to select the map view from among the potential map views by scoring each potential map view with a best score with respect to one or more maneuver points therein including by determining a straight line distance from the critical element to the one or more maneuver points and configured to provide the map data as a map view in which the critical element is positioned so as to appear in the map view along with more route information to or from the critical element relative to route information that appears when the critical element is centered in the map view.

9. The system of claim 8 wherein the route information comprises at least two roads and data corresponding to a maneuver point for turning from one road to another.

10. The system of claim 8 wherein the route information includes at least one landmark/point of interest.

11. One or more computer storage devices, having computer-executable instructions, which when executed, perform steps, comprising, returning a map view in response to an online request, including computing a map view based on a critical element that appears as a critical element representation within the map view and route data that appears as at least one route representation within the map view, including by positioning the critical element relative to the map view to have more of each route representation appear in the map view than if the critical element is not positioned, and wherein computing the map view further comprises using different distances from the critical element to determine a set of differently-sized bounding boxes that each contain the critical element and a different amount of route data, and determining the map view based on a largest bounding rectangle that does not exceed a size constraint associated with the map view, and computing a best score for the map view.

12. The one or more computer storage devices of claim 11 wherein the different distances are each straight line distances from the critical element, and wherein using the different distances comprises, for each straight line distance, traversing each route to determine a point on that route that reaches that straight line distance.

13. The one or more computer storage devices of claim 11 wherein computing the map view comprises: selecting each zoom level from a plurality of zoom levels, and for each zoom level, using different distances from the critical element to determine the set of differently-sized bounding boxes that each contain the critical element and route data, and determining the largest bounding box that does not exceed the size constraint associated with the map view to provide a candidate for that zoom level; scoring each of the candidates for the plurality of zoom levels; and determining the map view based on the candidate having the best score.

14. The one or more computer storage devices of claim 13 wherein scoring each of the candidates comprises computing an importance value corresponding to the route data within each candidate.

15. The one or more computer storage devices of claim 14 wherein computing the importance value for each candidate comprises evaluating each maneuver point within that candidate, or each landmark or other point of interest within that candidate, or any combination of each maneuver point and each landmark or other point of interest within that candidate.

* * * * *